July 29, 1924.
L. L. WHITSON
OIL GAUGE FOR CRANK CASES
Filed Oct. 11, 1920
1,503,179
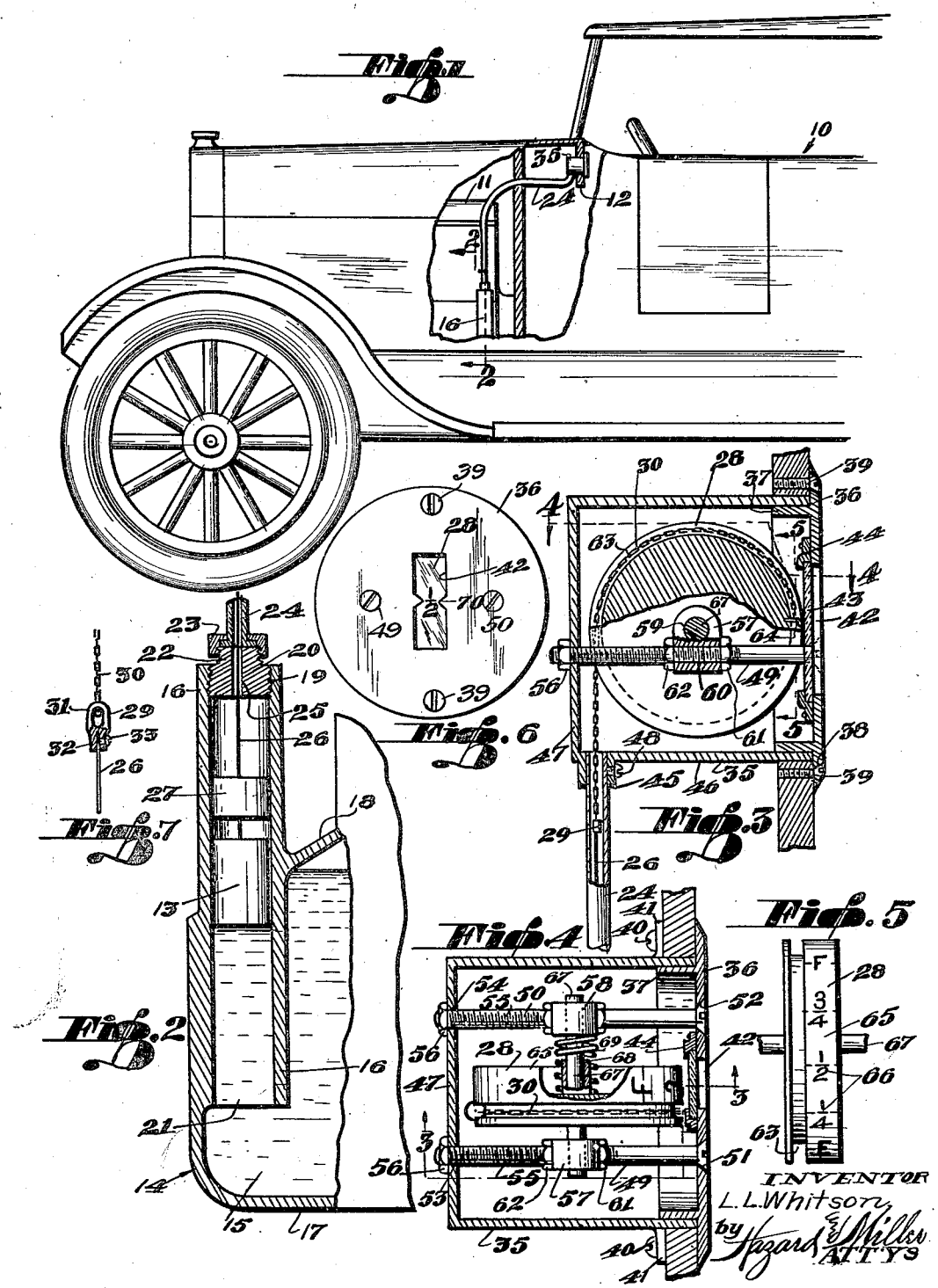

Patented July 29, 1924.

1,503,179

UNITED STATES PATENT OFFICE.

LINCOLN L. WHITSON, OF VAN NUYS, CALIFORNIA, ASSIGNOR OF ONE-FOURTH TO HAZEL L. HARDING AND GEORGE A. HARDING, BOTH OF VAN NUYS, CALIFORNIA.

OIL GAUGE FOR CRANK CASES.

Application filed October 11, 1920. Serial No. 415,959.

*To all whom it may concern:*

Be it known that I, LINCOLN L. WHITSON, a citizen of the United States, residing at Van Nuys, in the county of Los Angeles and State of California, have invented new and useful Improvements in Oil Gauges for Crank Cases, of which the following is a specification.

This invention relates to oil gauges, and particularly to an oil gauge adapted for use in connection with motor vehicles for indicating the amount of oil in the motor crank case.

The principal object of my invention is the provision of such a gauge which may be easily and quickly applied to any standard type of motor vehicle, which is simple and inexpensive to manufacture, and which is positive in its action and not likely to get out of order.

A further object is the provision of such a device wherein a suitable float is mounted on the crank case of the motor, and has a flexible connecting media connected with such float and actuating a direct reading indicator on the instrument board of the vehicle adjacent the driver's seat. A further object is to make an oil gauge having a main float and a reserve float, so that if the buoyancy of the main float decreases the reserve float will make up the deficiency.

The merits of my invention will be more fully set forth in the following specification, taken in connection with the accompanying drawings which form a part thereof, and in which;

Figure 1 is a fragmentary elevation of a typical motor vehicle, a portion being broken away to show my invention installed.

Fig. 2 is a transverse vertical section showing the manner of attaching the float to the crank case of the motor.

Fig. 3 is a transverse vertical section taken through the indicator casing, as indicated by the line 3—3 of Fig. 4, and showing a portion of the indicator wheel in section.

Fig. 4 is a sectional plan view taken as indicated by the line 4—4 of Fig. 3.

Fig. 5 is a view showing the indicator wheel in elevation as indicated by the line 5—5 of Fig. 3.

Fig. 6 is a view showing the removable front of the indicator casing, on a reduced scale.

Fig. 7 is a detail view of the link connection between the operating wire and chain.

In the drawings the numeral 10 indicates any typical automobile or motor vehicle, 11 the engine thereof, and 12 the instrument board mounted across the front of the body adjacent the driver's seat.

My invention comprises essentially a suitable main float 13, adapted to float in the oil 15 in the bottom of the engine crank case. The float 13 is mounted vertically slidable in a suitable casing 16, which may be formed integral with the crank case 14, or may be separate and attached thereto by any suitable means. The float casing 16 extends down into the crank case to a point adjacent its bottom 17, in order that it may accurately indicate the amount of oil therein. It also extends upwardly above the top 18, as shown in Fig. 2, although it may be entirely within the crank case and below the top 18. The top of the casing 16 is internally screw threaded as at 19, to receive an externally screw threaded plug 20; the opposite end of the casing being open as at 21. The plug 20 may be reduced as at 22 and externally screw threaded to receive a union nut 23, the latter adapted to rigidly clamp a tube 24 to the plug 20. The plug 20 has a central bore 25 concentric with the bore in the tube 24, through which the wire 26 passes.

The wire 26 extending from the main float 13 passes through the reserve float 27 and the float 27 is sufficiently attached to the wire 26 to hold the float in spaced relation and a slight distance from the float 13. The wire 26 passes through the plug 20 and through the tube 24 and is ultimately connected to the indicating mechanism including a wheel 28. The main float 13 and the reserve float 27 may be constructed of any suitable float material and preferably cork. The floats 13 and 27 are loosely mounted in the casing 16 so as to be operated by the oil 15 flowing upwardly into the bottom of the casing. If the bouyancy of the main float 13 decreases, the reserve float 27 will make up the deficiency, and in order to accurately indicate the level of the oil in the crank case, the connection from the floats to the wheel 28 must be adjusted from time to time, as will be hereinafter explained.

A link connection 29, Fig. 7, connects the wire 26 with a small chain 30, the latter adapted to be connected to the indicator wheel 28. The connection 29 has a loop or eye 31, and a lower tubular portion 32 for the reception of the upper end of the wire 26, the latter being secured in the tubular portion 32 by means of a set screw 33. The chain 30 is secured to the link 29 by means of one of its links passing through the eye 31. The object of such a connection is to eliminate all possible friction between the wire 26 and chain 30 and the tube 24.

The indicator wheel 28 is revolvably mounted in a suitable housing 35 secured to the instrument board 12 adjacent the driver's seat of the vehicle. The housing 35 may be of any suitable configuration to accommodate the indicator wheel 28 and its actuating mechanism. In this case it is shown to be cylindrical, Figs. 3 and 4. The housing 35 is open at the front and is provided with a suitable front closing plate 36, the latter having an inwardly extending flange 37, adapted to fit in the front opening, and having apertures 38 for the accommodation of screws 39 by which it is secured to the instrument board 12. The housing 35 may be secured to the instrument board in any suitable manner, as by screws 40 passing through lugs 41. The plate 36 may be of any suitable configuration, and it is here shown to be circular, as in Fig. 6.

The plate 36 has a central vertically extending aperture 42, for reading the numerical designations on the indicator wheel 28, as will be more fully hereinafter explained; and is provided with a glass window 43 held in place by means of a flange 44.

A tubular extension 45 formed integral with the bottom wall 46, of the housing 35 extends downwardly from a point adjacent the rear wall 47 for the reception of the tube 24, the latter being rigidly held in place by means of a set screw 48.

A pair of horizontally disposed screws 49 and 50 extend through apertures 51 and 52, respectively, in the front plate 36, and through apertures 53 and 54 in the rear wall 47, of the housing 35. The screws 49 and 50 are screw threaded as at 55, and are securely held in place by means of nuts 56. A pair of bearings 57 and 58 are adjustably supported on the bolts 49 and 50 and have bearing apertures 59 and apertures 60, the latter extending at right angles to the axis of the apertures 59 through which the bolts 49 and 50 extend. The bearings 57 and 58 are adjustably held in place on the bolts 49 and 50 by means of lock nuts 61 and 62.

The indicator wheel 28 is provided with a groove 63 in which the chain 30 rides, the latter being secured to a hook 64. A flange or band 65, is formed on the wheel 28, and carries the numerical designations or suitable indicia 66. A shaft 67 passes through a suitable hub 68, the latter being journaled to rotate freely in the apertures 59 of the bearings 57 and 58. A spiral spring 69 is mounted around the shaft 67, intermediate the wheel 28 and the bearing 58, and is secured at one end to the wheel 28 and at the opposite end to the bearing 58. The object of this spring is to cause the wheel 28 to exert a slight pull on the wire 26, to take up the slack therein, but is not of sufficient strength to overcome the weight of the float 27. The wheel 28 is mounted directly back of the window 43 so that the band 65 and indicia 66 may be clearly viewed therethrough. The indicia 66 may consist of any suitable designations such as E, indicating empty, at one extremity, and F, indicating full at the other extremity, and suitable intermediate designations such as ¼, ½ and ¾, properly spaced intermediate the designations E and F.

In the operation of my device the float 13 will float upon the top of the oil 15 in the crank case 14, and with the wire 26 and chain 30 adjusted to a length to permit the indicator wheel 28 to properly indicate the contents, a variation in the level of the oil will cause the float 13 to actuate the wheel 28 in either direction to accurately indicate this fact. The connection between the floats and the indicator wheel may be accurately adjusted by filling the crank case to a definite point with oil and adjusting the indicator to indicate the condition of the oil and then hooking the chain 30 upon the hook 64 and if the condition of the floats varies so as to make the indication inaccurate, the connection may be readjusted by applying a different link of the chain 30 to the hook 64. The window 43 has suitable marks or pointers 70 thereon, by which the designations on the wheel 28 are read. Thus it will be seen that I have provided a device which is extremely simple, not likely to get out of order by vibrations and jolts of the vehicle, and which will accurately indicate the amount of oil in the crank case.

While I have here shown and described the preferred form of my device, it is understood that I reserve the right to make any changes or modifications in structure which properly come within the scope of the claim.

Having described my invention I claim:

An oil gauge for crank cases comprising the combination with an engine crank case and an instrument board, of a vertical casing forming a float chamber communicating with the bottom of the chamber of the crank case, a plug closing the upper end of the casing and having a bore, a tube connected to the plug, a housing mounted upon the instrument board and connected to the tube, a main float and a reserve float in the float chamber, a wire connected to the main float and passing upwardly through the reserve float and connected to the reserve float and passing through the tube, an indicator wheel rotatably mounted in the housing and adjustably connected to the wire, and a spring connected to the indicator wheel to wind up the connection when the floats go up under the influence of oil in the crank case and adapted to yield under the weight of the floats when the oil goes down in the crank case.

In testimony whereof I have signed my name to this specification.

LINCOLN L. WHITSON.